United States Patent [19]

Vilmanyi et al.

[11] Patent Number: 5,725,336
[45] Date of Patent: Mar. 10, 1998

[54] THREAD TAPPING CUTTING TOOL

[76] Inventors: Laszlo Vilmanyi; Laszlone Vilmanyi; Gabor Vilmanyi, all of H-1091, Harrok utta S.; Janos Simon, H-1155, Rakos ut 94, all of Budapest, Hungary

[21] Appl. No.: 495,586
[22] PCT Filed: Mar. 31, 1993
[86] PCT No.: PCT/HU93/00019
 § 371 Date: Aug. 10, 1995
 § 102(e) Date: Aug. 10, 1995
[87] PCT Pub. No.: WO94/17946
 PCT Pub. Date: Aug. 18, 1994

[30] Foreign Application Priority Data

Feb. 11, 1993 [HU] Hungary .............. P9300345

[51] Int. Cl.$^6$ .............................................. B23G 5/06
[52] U.S. Cl. ................... 408/219; 408/222; 470/198
[58] Field of Search .................. 408/215, 216, 408/218, 219, 222; 470/198, 204

[56] References Cited

U.S. PATENT DOCUMENTS

| | | | |
|---|---|---|---|
| 1,210,508 | 1/1917 | Marye | 408/218 |
| 1,478,414 | 12/1923 | Wells . | |
| 1,508,594 | 9/1924 | Brubaker, Jr. | 408/219 |
| 1,693,768 | 12/1928 | Steinruck | 408/219 |
| 3,945,069 | 3/1976 | Cecil | 408/222 |
| 4,181,457 | 1/1980 | Holmes | 470/198 |

FOREIGN PATENT DOCUMENTS

| | | | |
|---|---|---|---|
| 1333181 | 6/1963 | France . | |
| 93503 | 8/1897 | Germany | 470/198 |
| 252407 | 10/1912 | Germany | 470/198 |
| 3643744 | 6/1988 | Germany . | |
| 70793 | 4/1917 | Hungary . | |
| 523922 | 7/1957 | Italy | 470/198 |
| 422553 | 4/1974 | U.S.S.R. | 470/198 |

OTHER PUBLICATIONS

Dr. Bakondi–Dr. Kardos: Manufacturing Technology, vol. I, p. 226, Educational Publisher, 1963.
Section 6.3 "Tap Drills" in the book Mrs. L. Arato–M. Vagi: Screw Threads, Tancsics Publisher, 1968, pp. 238–245.

*Primary Examiner*—Daniel W. Howell
*Attorney, Agent, or Firm*—Greenblum & Bernstein, P.L.C.

[57] ABSTRACT

A thread tapping cutting tool includes a working part with a chamfer portion, control portion, and at least two thread cutting wings (separated by flutes) formed therein. The chamfer portion is at least one half of the length of the working part. Each of the two or more thread cutting wings has a width of not more than 0.2 times a tap drill outer diameter of the working part, and not less than 0.02 times the tap drill outer diameter. The chamfer portion has plane surface lands on the cutting wings at the outer edge, and a relief angle of the plane surface lands is greater than 5 degrees. The core diameter of the cutting wings is defined by the depth of the flutes, and is not more than 0.35 times the tap drill outer diameter.

14 Claims, 1 Drawing Sheet

THREAD TAPPING CUTTING TOOL

BACKGROUND OF THE INVENTION

1. Field of the Invention

The present invention relates to a thread tapping cutting tool which, due to increased room for accommodating chips and a reduced load on the cutting wings, is especially suitable for thread tapping (preferably with increased speed) in a range of increased sizes, preferably from M 12 to M 58 or from C¼" to C3 ".

2. Description of Relevant Materials

It is well known that taps are multiple-edge cutting tools for cutting threads in bores. The thread tapping tool (tap-drill) can be considered a screw in which flutes are machined in order to form cutting edges. The tap drill as known has a working part, provided with a chamfer portion and a control portion, arranged at one end of a generally cylindrical shank. The remaining end of the shank is preferably of rectangular section for fitting purposes. The working part has at least two cutting wings separated by flutes formed therein. The flutes store the chips already separated and introduce cooling and/or lubricating media if necessary.

During thread tapping, the two basic requirements are accuracy and productivity. As is well known, accuracy in tapping is assured by the accuracy of the tool itself and by means of proper guiding of the tool. At the same time, productivity is obtained by increasing the cutting speed, limited by production of heat and chips that must be removed from the bore at the rate of production. Two contradictory requirements must be balanced: the working surface of the tapdrill in contact with the part to be machined shall be as large as possible in order to achieve analcurate guiding, but at the same time, the reduction of friction and heat generation requires that the active cutting surface be minimized. (Dr. Bakondi —Dr. Kardos: Manufacturing Technology, Vol. 1 , p. 226 , Educational Publisher, 1963 .)

The status of technology is well reflected in section 6.3 ("Tap drills") in the book: Mrs. L. Aratéo —M. Vagi: Screw Threads, (Tancsics Publisher, 1968 ) which presents a detailed description of the tap-drills known and used at present, together with their design, geometry and dimensions. According to this reference, the recommended value for the width of the cutting wings (land width) is 0.35 D in the case of three-flute tap-drills and 0.28 D in the case of four-flute tap-drills (where D represents the tap-drill outer diameter). According to the literature, the flute depth is defined by the core diameter $d_r$ which is equal to 0.4 to 0.5 D. The core diameter $d_r$ is selected as a result of a tradeoff so as to obtain a chip-room as large as possible while maintaining the proper strength. Otherwise, experience shows that chips clogging the flutes due to improper flute section results in tap breakage more frequently than insufficient strength of the tap-drills.

It is also well known that a tap-drill has a working part provided with a chamfer portion and a control portion arranged at one end of the shank. Within the working part, the proper selection of the lengths of the chamfer and control portions is essential. The chamfer length is always determined by taking the cutting conditions into consideration. For example, the chamfer length is different in the case of hand or machine tapping (drill-set), or screw tapping in soft or hard materials etc. Generally, tap-drills with short chamfer lengths are used in the practice, and the length of the control portion exceeds - often by several times - the chamfer length. Based on the related literature, the land relief in the chamfer portion of the tap-drill is absolutely necessary. However, land relief is unnecessary (even disadvantageous) in the control portion, except in the cases of machined or milled nut-taps where the tap-drill is not reversed. When machining threads in nuts (in fact, for nut-taps) the chips accumulated in the flutes cannot be crowded between the land and the machine surface. The value of the relief angle in the chamfer portion is conventionally 10 to 12 degrees in the case of machine-taps and nut-taps, and 6 to 8 degrees in the case of hand-taps.

An interesting solution is described in the Hungarian patent specification No. HU 70 793 , where alternative sides of subsequent threads on the cutting wings are cut away, thus preventing chips from clogging and the tap-drill from being jammed. Thus, the cutting edges of the tap-drill fit loosely and run more freely in the threads formed, while the two sides of threads will be alternatively cut by one and the other side of cutting edges.

The solution described in the German patent specification No. OS 36 43 744 is suitable to be used primarily in the case of tap-drills for readjusting for wear during normal use, or for trapping threads to be galvanized (i.e., threads of unusual dimensions), in which the tap-drill outer diameter is variable.

As a conclusion relating to the known solutions, the tapping speed that can be obtained can be considered as identical to more conventional taps and the dimensioning of the tap-drills can also be considered as conventional (i.e., within the range of the data presented above relating to tapping-drills).

SUMMARY OF THE INVENTION

The present invention aims at presenting a solution that enables a significantly increased cutting speed to be obtained when compared to known and conventional solutions, and that can be implemented by means of traditional manufacturing methods using known (not special) basic material, and in addition, the present invention can be used in a wide range of sizes and bore diameters.

We carried out experiments that revealed that increased friction between the tap-drill and the workpiece (and frequently any jamming) will occur between the generated chip(s) and the surfaces of the tap-drill and workpiece, rather than directly between the tap-drill and workpiece surface. Experiments were also carried out to determine how to reduce the friction, that is, how to reduce the load acting on the cutting edges during thread tapping. It has been found that (breaking away from former professional prejudices) the width of the cutting wings can be significantly reduced (to not more than 0.2 times the outer diameter D and not less than 0.02 times the outer diameter D) without influencing the strength of the tap-drill significantly. It is very important to avoid influencing the strength of the tap-drill significantly as it is a cutting tool that is concerned. Other dimensions of the tap-drill shall also be altered to fit the proposed width of the cutting wings.

The reduction of the width of the cutting wings (thus, reduction of load) also enables the core diameter $d_r$ to be reduced. According to our experiments, core diameter $d_r$ sizes less than 0.35 times the outer diameter D can also be implemented. Again, as our experiments show, this involves the benefit of increasing the chip-room, thus allowing larger space to store the chip generated and to remove the chips without clogging.

In order to safely implement our proposed width of the cutting wing, we developed a solution which enables the load acting on the cutting wing to be reduced in comparison to the solutions known at present. In our solution, the chamfer length and its proportion to the control length is significantly increased in relation to the known tap-drills. Thus, the chip separation will be shared between several cutting wing sections, which assures a more uniform load that is more evenly distributed along the chamfer length. As the experiments show, in order to obtain proper strength of the tap-drill while reducing the width of the cutting wings and the core diameter, the chamfer length shall be equal to at least the half length of the working part.

With respect to the cutting energy, it is known that the use of relief improves the cutting conditions significantly. It is further known that the chamfer portion is always provided with relief, and this rule is the same in our case. However, in the case of known solutions, the land surface of the chamfer portion is curved due to the relatively large width of cutting wings. We found that it is preferable to use a plane land surface in the chamfer portion. In fact, the plane land surface design eliminates the occurrence of any jamming due to the elastic nature of materials during cutting.

Thus, the present invention relates to a thread tapping cutting tool having a working part provided with a chamfer portion and a control portion arranged at one end of a shank, while the other end of said shank is preferably of rectangular section so as to serve for fitting to a tool. The working part contains at least two cutting wings and flutes between the cutting wings. The flutes are suitable for storing the separated chips and for introducing cooling and/or lubricating media if necessary. According to the invention, the width of the cutting wings is designed to a value not more than 0.2 times the tap-drill outer diameter D and not less than 0.02 times the tap-drill outer diameter, while the core diameter is designed to a value not more than 0.35 times the tap-drill outer diameter. Within the working part, the chamfer length is equal to at least half the length of the working part. Furthermore, the land surface of the chamfer part is designed as a plane surface having a relief angle exceeding 5 degrees, and preferably of 15 degrees.

Our experiments show that, in the case of a through-hole tap and/or a pre-tapping hand-tap, it is recommended that the chamfer length is further increased to be at least 75 % of the length of the working part.

In a preferred embodiment of the thread tapping cutting tool, the length of the working part is not more than 10 pitches, while the chamfer length is equal to the length of control portion, in the case of a dead-hole tap and/or final tapping hand-tap. The solution in which the working part is of 6 -pitch length is particularly preferable.

In the case of thread tapping cutting tool designed as described above, it is not absolutely necessary to use land relief in the control part (i.e., land relief may be eliminated in the control portion). In fact, the use of land relief in the control portion would be very difficult and would require high accuracy in machining. If necessary, land relief can be used in the control portion; in this case a value of 0.02 mm is sufficient.

In a particularly recommended embodiment of the thread tapping cutting tool according to the present invention, the width of cutting wings will be preferably not more than 0.056 times the tap-drill outer diameter while the core diameter will be preferably not more than 0.25 times the tap-drill outer diameter and not less than 0.2 times the tap-drill outer diameter.

BRIEF DESCRIPTION OF THE DRAWINGS

A possible design of the thread tapping cutting tool according to the present invention will be described in detail as an example, based on the annexed drawing, where.

DETAILED DESCRIPTION OF THE PREFERRED EMBODIMENTS

Figure 2:
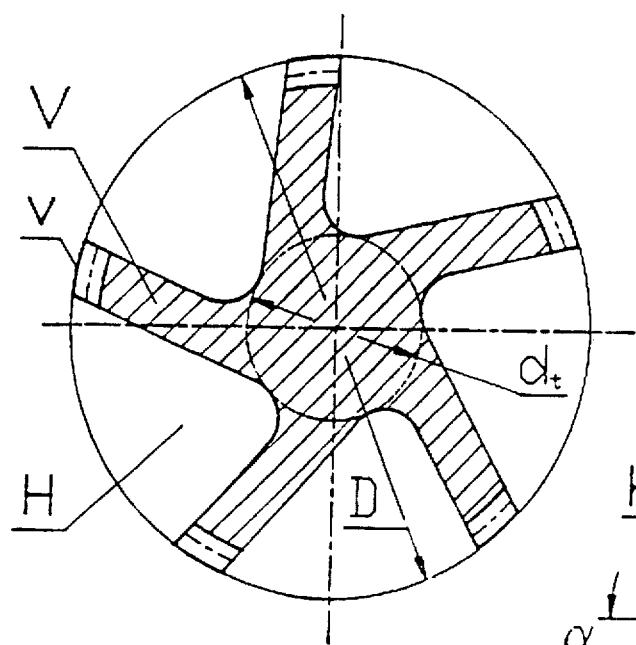
FIG. 2 shows the sectional view A—A of the chamfer part.
Figure 1:
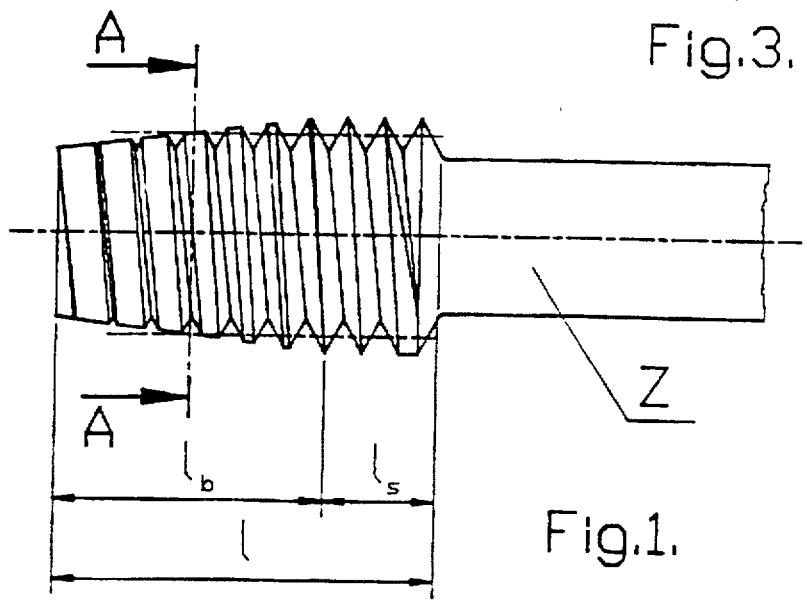
FIG. 1 shows the sketch of the tool in side-view.

A thread tapping cutting tool shown in FIG. 1 has a working part 1 provided with chamfer portion $1_b$ and control portion $1_r$ arranged at one end of a shank Z. The other end of the shank Z is preferably of rectangular section for fitting the shank Z to a tool. According to the invention, the working part 1 contains at least two cutting wings V —five in this embodiment as shown in FIG. 2 —and flutes H between the cutting wings V at least alongside the cutting wings V. The flutes H serve the purpose of storing the chip already separated and of introducing cooling and/or lubricating media if necessary. Within the working part 1, the chamfer length $1_b$ is equal to at least half the length of the working part 1 —in this embodiment at least 75 percent as an example.

FIG. 2 shows a sectional view of the chamfer portion $1_b$ at section A—A. According to our invention, the width v of the cutting wings V is designed to a value not more than 0.2 times the tap-drill outer diameter D and not less than 0.02 times the tap-drill outer diameter D, i.e., $v \leq 0.2\ D$ and $V \geq 0.02\ D$, while the core diameter $d_r$ of cutting wings is designed to a value not more than 0.35 times the tap-drill outer diameter D, i.e., $d_r \leq 0.35$ FIG. 2 shows clearly that, as a result of the reduced core diameter $d_r$ and width v of the cutting wings V according to our solution, flutes H of large section (volume) are present between the cutting wings V (and at least alongside the said cutting wings V), the large flutes H serving for purposes of storing the separated chip(s) and introducing cooling and/or lubricating media if necessary.

Figure 3:
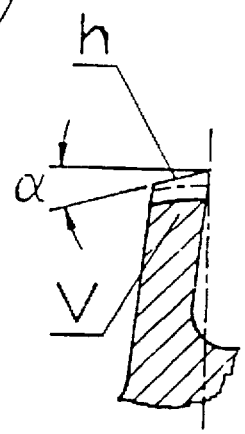
FIG. 3 shows the magnified view of one of the cutting wings of the tool shown in FIG. 2.

FIG. 3 shows a magnified view of one of the cutting wings V. It is clearly shown that the land h of the chamfer portion $1_b$ is designed as plane surface, and that the relief angle α exceeds 5 degrees (and is preferably 15 degrees).

The function of the thread tapping cutting tool according to the present invention is described below in detail. The thread tapping cutting tool as described herein can be well utilized as either a hand tap or a machine tap. In the present case, it is essential that the chamfer part $1_b$ length is equal to at least half the length of the working part 1 length (within the working part 1). In the case of throughhole tapping and/or pre-tapping by hand, the chamfer portion $1_b$ length is further increased. In such cases, the chamfer portion $1_b$ length will be at least 75 percent of the working part 1 length.

Conventionally and in conformity with the German DIN Standard in force at present, standard chamfer portion $1_b$ lengths are as follows:

Taper "A": 6 -pitch
Taper "B": 4 -pitch +guide edge
Taper "C": 2 to 3 +pitch
Taper "D": 4 -pitch
Taper "E": 1.5 -pitch.

In our solution, a much longer chamfer portion $1_b$ (in comparison to the chamfer portion length of known solutions described above) is used. The longer chamfer portion (even of 12 -pitch length) has the advantage that the chip separation is more evenly distributed, thus reducing the load acting on the cutting edges. Preferably, the width v of the cutting wings V and the core diameter $d_r$ are also selected as described previously (i.e., v ≦0.056 , while $d_r$ ≧0.25 D and $d_r$ ≧0.2 D) thus obtaining a very favorable flute section. The flutes H thus obtained are suitable for storing the separated chip(s) and for introducing any known cooling and/or lubricating media if necessary.

If the thread tapping cutting tool is used as a dead-hole (blind hole) tap and/or final tapping hand tap (where the tap-drill is reversed), the thread tapping cutting-tool preferably has a working part 1 of no more than 10-pitch length, and a chamfer portion $1_b$ length equal to the length of the control portion $1_s$. In such cases, an embodiment with a working part 1 of 6-pitch length is very recommended.

In the thread tapping cutting tool designed according to the present invention, land relief in the control parts $1_s$ is not necessarily needed (that is, it is unnecessary). This facilitates the production of the tool. In fact, the formation of land relief is an operation that requires a special machine and high professional skill. Of course, land relief may optionally be used in the case of the thread tapping cutting tool according to the present invention; in this case, the relief value shall be up to 0.02 mm.

An advantage of the solution according to the present invention is that it can be used in a wide range of thread sizes. For example, the solution can be used at least in the range of M12 to M68 and C¼" to C3", respectively, without any particular difficulties. The advantages of the solution also appear in the availability of the use of basic material for the production of the tap-drill. Our experiments show that no special restrictions in material choice are necessary. Preferably, the thread tapping tools can be made of high-speed steel or alloy steel. However, if a cutting tool of special durability shall be produced, the durability of the cutting edges can be improved by applying some kine of PVD layer, e.g., titanium nitride, titanium carbonitride, in order to extend the service life.

By using the thread tapping cutting tool described in the present invention, a speed of as much as 200 to 250 rev./min can be achieved, and bores of size (both length and diameter) can be tapped that have been unprecedented in the literature so far. Furthermore, the service life of the tap-drill according to the present invention is significantly extended as compared to the known tap-drills made of same material. That is, many times as many workpieces as in the case of conventional solutions can be machined reliably without sharpening, and without any failure or breakage of the tool.

We claim:

1. A thread tapping cutting tool, comprising:
   a shank having an end section for fitting to a tool; and
   a threaded working part having a tap drill outer diameter, and including:
   a chamfer portion at least one half of a length of said working part, said chamfer portion having plane surface lands at an outer edge thereof, a relief angle of said plane surface lands being greater than 5 degrees;
   a control portion; and
   at least two thread cutting wings separated by flutes in said working part, each of said at least two thread cutting wings having a width of not more than 0.2 times said tap drill outer diameter and not less than 0.02 times said tap drill outer diameter, a core diameter of said cutting wings being defined by a depth of said flutes, said core diameter being not more than 0.35 times said tap drill outer diameter.

2. The thread tapping cutting tool according to claim 1, said control portion having plane surface lands at an outer edge thereof, said lands having land relief of no more than 0.02 mm.

3. The thread tapping cutting tool according to claim 2, each of said at least two thread cutting wings having a width of not more than 0.056 times said tap drill outer diameter, said core diameter being not more than 0.25 times said tap drill outer diameter and said core diameter being not less than 0.20 times said tap drill outer diameter.

4. The thread tapping cutting tool according to claim 1, wherein
   said thread tapping cutting tool is one of a through-hole tap and a hand pre-tapping tap, and
   said chamfer portion is at least three quarters the length of said working part.

5. The thread tapping cutting tool according to claim 4, said control portion having plane surface lands at an outer edge thereof, said lands having land relief of no more than 0.02 mm.

6. The thread tapping cutting tool according to claim 5, each of said at least two thread cutting wings having a width of not more than 0.056 times said tap drill outer diameter, said core diameter being not more than 0.25 times said tap drill outer diameter and said core diameter being not less than 0.20 times said tap drill outer diameter.

7. The thread tapping cutting tool according to claim 1, wherein
   said thread tapping cutting tool is one of a dead-hole tap and a hand final tap,
   said working part is of no more than 10-pitch length, and
   said chamfer portion is substantially the same length as said control portion.

8. The thread tapping cutting tool according to claim 7, said control portion having plane surface lands at an outer edge thereof, said lands having land relief of no more than 0.02 mm.

9. The thread tapping cutting tool according to claim 8, each of said at least two thread cutting wings having a width of not more than 0.056 times said tap drill outer diameter, said core diameter being not more than 0.25 times said tap drill outer diameter and said core diameter being not less than 0.20 times said tap drill outer diameter.

10. The thread tapping cutting tool according to claim 1, each of said at least two thread cutting wings having a width of not more than 0.056 times said tap drill outer diameter, said core diameter being not more than 0.25 times said tap drill outer diameter and said core diameter being not less than 0.20 times said tap drill outer diameter.

11. The thread tapping cutting tool according to claim 1, said control portion having lands at an outer edge thereof.

12. The thread tapping cutting tool according to claim 1, wherein said relief angle of said plane surface lands is 15 degrees.

13. The thread tapping cutting tool according to claim 1, wherein said end section of said shank is rectangular.

14. A thread tapping cutting tool, comprising:
   a threaded working part having plane surface lands at an outer edge thereof, a relief angle of said plane surface lands being greater than 5 degrees, said threaded working part having a tap drill outer diameter; and
   at least two thread cutting wings separated by flutes in said working part, each of said at least two thread cutting wings having a width of not more than 0.2 times said tap drill outer diameter and not less than 0.02 times said tap drill outer diameter, a core diameter of said cutting wings being defined by a depth of said flutes, said core diameter being not more than 0.35 times said tap drill outer diameter.

* * * * *